United States Patent
Klappenecker

[15] 3,690,474
[45] Sept. 12, 1972

[54] CONVEYING DEVICE WITH TWO END POSITIONS CONNECTED BY A CONVEYOR BELT AND INCLUDING A CONTROLLABLE DRIVE CONNECTION

[72] Inventor: Karl Klappenecker, Constance, Germany

[73] Assignee: Licentia Patent-Verwaltungs-GmbH, Frankfurt am Main, Germany

[22] Filed: July 28, 1971

[21] Appl. No.: 166,666

[30]   Foreign Application Priority Data

July 30, 1970   Germany..........P 20 37 741.7
    July 30, 1970   Germany..........P 70 28 610.1

[52] U.S. Cl......................214/7, 271/DIG. 7, 271/87
[51] Int. Cl..............................................B65g 60/00
[58] Field of Search.................214/7; 271/87, DIG. 7

[56]         References Cited
       UNITED STATES PATENTS 3,152,701   10/1964   Weiland .......................214/7
3,363,782   1/1968    Burkhardt et al..............214/7

FOREIGN PATENTS OR APPLICATIONS 1,259,252   1/1968    Germany..............214/DIG. 7

*Primary Examiner*—Robert J. Spar
*Attorney*—George H. Spencer et al.

[57]          ABSTRACT

In a conveying device of the stacker type including a linearly displaceable carriage and a conveyor belt from which the carriage derives a motive force, a controllable drive connection is provided between two movable rollers, which form part of the connection, and means are provided to connect the two movable rollers so that the translation ratio definable by the peripheral speeds of the two rollers can be greater or less than 1 depending on the desired direction of movement of the carriage, or a pair of controllable drive connections, one with a translation ratio greater than 1, and one with a translation ratio less than 1, are provided so that the carriage can be controlled in both directions of motion.

6 Claims, 3 Drawing Figures

CONVEYING DEVICE WITH TWO END POSITIONS CONNECTED BY A CONVEYOR BELT AND INCLUDING A CONTROLLABLE DRIVE CONNECTION

BACKGROUND OF THE INVENTION

The present invention relates to a conveying device, particularly of the stacker type.

The stacker type of conveying device contemplated usually has two end locations connected by at least one conveyor belt, which locations serve as the input and discharge points for items to be stacked. One of the end locations is fixed, while the other is disposed on a linearly displaceable carriage. The forward reach of the conveyor belt extends from a fixed roller, i.e. a roller mounted on the machine base at the fixed position, to a first movable roller, i.e. a roller mounted on the linearly displaceable carriage, and from a second movable roller also on the carriage to a further fixed roller parallel to the displacement path of the carriage. The return reach of the belt extends in a corresponding manner over two further movable rollers and back to the fixed roller. The conveyor belt is driven by one of the fixed rollers, while the driving power for the carriage is derived, in at least one direction of displacement, from the drive of the conveyor belt.

A conveying device exhibiting these features is disclosed, for example, in German Pat. No. 1,148,943, in the form of an intermediate stacker for a stack of flat items such as pieces of mail. Here, too, the driving power for the carriage is derived from the drive of the conveyor belt. This is done in such a manner that continuous braking of rollers disposed along the forward reach of the conveyor belt produces a force which acts on the carriage in the direction toward the stack of items, while for the drive in the opposite direction one or a plurality of movable rollers disposed along the return reach of the conveyor belt are controllably braked by a sensor which scans the stack pressure.

The derivation of the motive force for the carriage from the drive of the conveyor belt by the braking of rollers disposed on the carriage has various drawbacks. For example, a not insignificant portion of the drive power imparted to the above-mentioned conveyor is not utilized as part of the carriage motive force, but is instead dissipated as heat due to friction. In order to keep the undesired heating of the components disposed on the carriage within permissible limits, this heat must be dissipated to a sufficient degree. Also, with an intermediate stacker it is further necessary that the carriage compensate as rapidly as possible for changes in stack length or stack compression force produced by the addition and removal of items by an appropriate corrective movement without, however, passing beyond a predetermined position which passing could be caused by the mass inertia involved. This means that the corrective movements of the carriage should start at as high an acceleration as possible but should not reach any very high speed values. This cannot be effectively realized in practice for a drive system operating, as the known system, with an "impressed force", that is, with a derived motive force.

SUMMARY OF THE INVENTION

It is, therefore, the object of the present invention to provide a conveying device of the intermediate stacker type in which the above-mentioned drawbacks are avoided.

This as well as other objects are accomplished by the present invention in that a controllable drive connection is provided between two movable rollers, which form part of the connection, of which one roller is in engagement with the forward reach and the other with the return reach of the conveyor belt. The drive connection also includes means connecting the two movable rollers so that the translation ratio definable by the peripheral speeds of the two rollers can be greater or less than 1 depending on the desired direction of movement of the carriage. Also, a pair of controllable drive connections can be incorporated, one with a translation ratio greater than 1 and one with a translation ratio less than 1, so that the carriage can be controlled in both directions of motion.

If the conveying device is to be used for receiving and/or discharging flat items, as for example pieces of mail, a second conveyor belt may be provided in an advantageous manner as is the case, for example, in the device according to German Pat. No. 1,148,943. The second conveyor belt together with the first conveyor belt forms a mutually contacting conveyor belt segment between the fixed and the movable end locations. This second conveyor belt extends away from the movable end location to the opposite side of the carriage from the first conveyor belt and extends otherwise in a corresponding manner between a fixed and a movable roller parallel to the displacement path of the carriage.

DESCRIPTION OF THE PREFERRED EMBODIMENT

Figure 1:
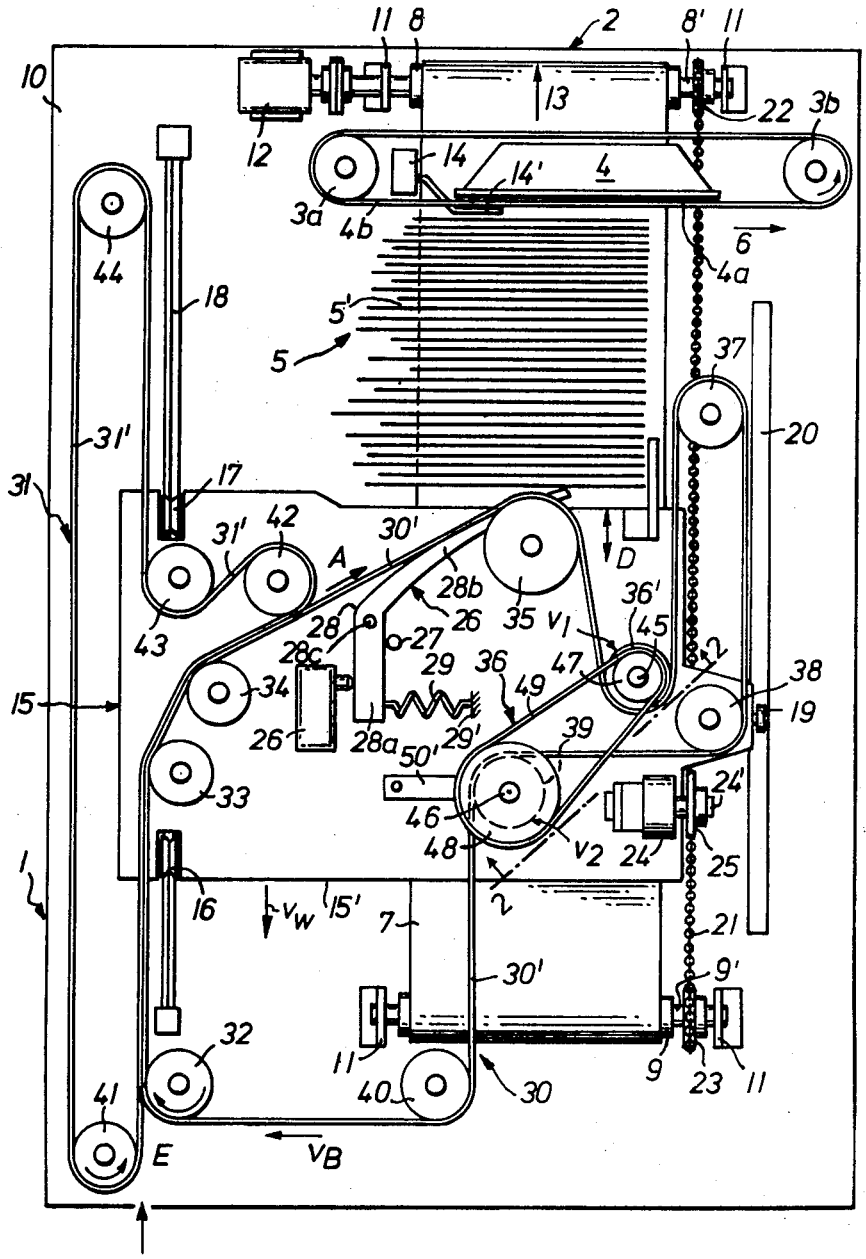
FIG. 1 is a schematic plan view of an intermediate stacker for mail items employing the improved drive connection of the present invention.

An intermediate stacker 1 of the present invention is shown in FIG. 1. The intermediate stacker comprises a mounting base 10 on which a carriage assembly 15, a separator assembly 2 and a stack 5 of, for example, mail letters are assembled.

The separate assembly 2 includes a suction trough 4, a belt 4b, a floor belt 7 perpendicular to belt 4b and individual means for driving the belts 4b and 7.

The floor belt 7 is guided around rollers 8 and 9 which are spaced apart in the direction of the length of the mounting base 10. The rollers 8 and 9 are mounted on the shafts 8' and 9' respectively. These shafts are in turn supported at their ends in bearing blocks 11 mounted on base 10. Shaft 8' is driven by, for example, a gear motor 12, so that the belt 7 will move in the direction indicated by the arrow 13.

A chain 21 extends parallel to the floor belt 7 and engages a pair of sprockets 22 and 23 mounted on shafts 8' and 9', respectively. The purpose of this chain will be described more fully hereinafter.

The stack 5 is supported on the floor belt 7 and is displaceable therewith. A suction trough 4 is supported by means (not shown) so that it extends with its suction applying side 4a perpendicular to the path of travel of the stack 5 on the floor belt 7. The suction trough 4 has associated therewith the belt 4b. The belt 4b is guided around rollers 3a and 3b in a direction parallel to the extent of side 4a of the suction trough 4. The belt 4b has, for example, two groups of holes (not shown), which pass in front of the suction trough 4 when the belt 4b is driven by the roller 3b in the direction indicated by the arrow 6. The roller 3b is driven in any conventional manner by means (not shown). The suction from trough 4 retains the individual items 5' against the belt 4b which in turn removes the items from stack 5 in the direction of the arrow 6 to a further conveying device (not shown).

The gear motor 12 is controlled by a key switch 14 which is mounted to the base 10 in any conventional manner (not shown). The key switch 14 is disposed in the area of the suction trough 4, so that it interrupts the drive current to motor 12 whenever items are in contact with the sensor arm 14' of the switch 14. The suction from the trough 4 is exerted on the stack 5, the individual item 5' of which responds in a manner stated above.

The carriage assembly 15 includes a stacking carriage 15', two conveyor belt assemblies 30 and 31, a sensing device assembly 26 and a controllable drive assembly 36.

The carriage 15' includes a pair of profiled rollers 16 and 17 on one side thereof and a roller 19 on the opposite side thereof. The rollers 16 and 17 engage a rail 18 while the roller 19 engages a rail 20. Both rails 18 and 20 are supported on mounting base 10. Consequently, the carriage 15' can be guided in the direction indicated by the arrow D along the rails 18 and 20.

The stacking carriage 15' may be driven in the forward direction, toward the stack 5, by means of the chain 21 which moves over the sprockets 22 and 23 as disclosed in German Pat. No. 1,237,505. The sprockets 22 and 23 are disposed on axles 8' and 9' respectively and are thus driven simultaneously with the floor belt 7. A controllable brake 24 is mounted on the stacking carriage 15'. The brake 24 has a shaft 24' on which sprocket 25 is mounted. The sprocket 25 is in contact engagement with chain 21.

When the floor belt 7, and thus chain 21, are being driven, the stacking carriage 15' will be moved along the rails 18 and 20 in a direction toward the stack 5 when the brake 24 is excited and thereby engaged so that the sprocket 25 is kept from rotating. The brake 24 is excited by a switch 26' whenever this switch is not actuated, i.e. is in its rest position.

The switch 26' is part of the sensing device assembly 26. This assembly further includes a sensing lever 28 which is pivotally mounted by a pin 28c to the carriage 15'. The sensing lever 28 has an arm 28a which is adapted to engage the switch 26' and an arm 28b which is adapted to engage the stack 5. The arm 28a has attached thereto one end of a tension spring 29. The tension spring 29 has its other end attached to an attaching means 29'; mounted on the carriage 15'. The spring 29 biases the lever 28 in a counterclockwise direction (as shown in FIG. 1), so that lever arm 28a engages against a stop pin 27 while lever arm 28b engages the stack 5. When the force exerted by the stack 5 against the lever arm 28b is sufficient to cause the sensing lever 28 to rotate clockwise, then lever arm 28a will actuate switch 26'.

The transfer of mail items 5' from the stationary end location, or intake point, E to the movable end location, or discharge point, A takes place with the aid of two conveyor belt systems 30 and 31 which pass over rollers which are in part mounted on the machine base 10, these being fixed rollers, and in part on the stacking carriage 15', these being movable rollers.

The forward reach of the conveyor belt 30' of the conveyor belt system 30 extends from the driven fixed roller 32 over the movable rollers 33, 34, 35 and 36' to a further fixed roller 37. Roller 35 acts as a stacking roller. The return reach of conveyor belt 30' extends from roller 37 via two further movable rollers 38 and 39 to a fixed roller 40 and back to the fixed roller 32. The forward reach of the second conveyor belt 31 of the conveyor belt system 30 extends from the driven fixed roller 41 over the movable rollers 42 and 43 to a further fixed roller 44. The return reach of the conveyor belt 31' extends from the fixed roller 44 back to the fixed roller 41. The forward reach of the conveyor belt 31' together with the first conveyor belt 30' forms, in a known manner, a mutually contacting conveyor belt segment between the fixed end location E and the movable end location A.

The above-mentioned rollers are so disposed that those sections of conveyor belts 30' and 31' which lie between a fixed and a movable roller extend parallel to the displacement path of the stacking carriage 15'.

The above-described components of the illustrated intermediate stacker assembly are substantially known and are disclosed, for example, in U.S. Pat. No. 3,363,782.

The stacking carriage 15' is driven in the direction of its return movement, away from the stack 5, by a controllable drive connection assembly 36 which is provided between the two movable rollers 36' and 39. The movable roller 36' is in engagement with the forward reach of conveyor belt 30' and the roller 39 is in engagement with the return reach of the conveyor belt 30'. The drive connection assembly 36 has a certain translation ratio Q which will be described in detail hereinafter.

Figure 2:
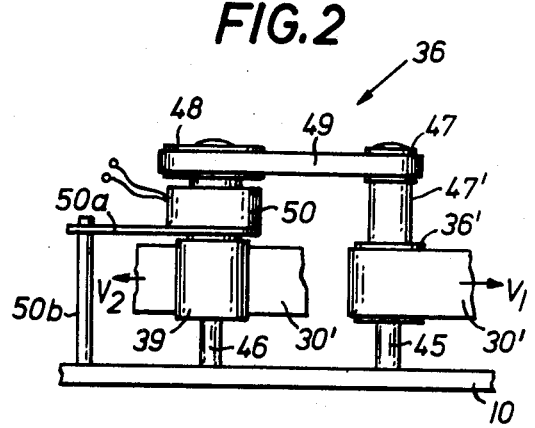
FIG. 2 is a side view taken along line 2—2 of FIG. 1 showing further details of the drive connection.

Referring now to FIG. 2, in which elements 7 and 15' are not shown for purposes of clarity, rollers 36' and 39 are mounted to be freely rotatable on axles 45 and 46 respectively. Roller 36' is supported by a bushing 47' which also supports a pulley 47. Both the roller 36' and the pulley 47 are fixedly connected to the bushing 47' in any conventional manner.

Figure 3:
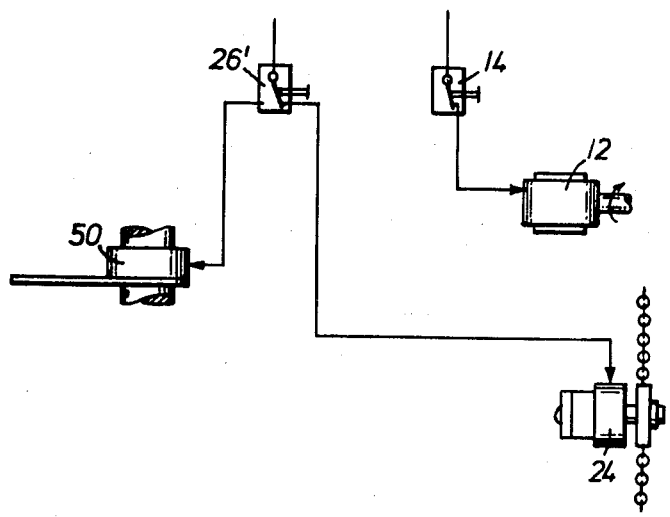
FIG. 3 is a simplified circuit diagram showing the control and drive members of the present invention.

A further pulley 48 of somewhat larger diameter than pulley 47 is mounted to be freely rotatable on axle 46. Pulleys 47 and 48 are mounted on their respective axles 45 and 46 at the same distance from mounting plate 10 (FIG. 2). The pulleys 47 and 48 are connected together by a drive belt 49. An electrically operated clutch 50 is disposed on axle 46 between roller 39 and pulley 48. The stationary casing of the clutch 50 is secured against rotation by an arm 50a which in turn engages a pin 50b. As a result, the rotatable portions of clutch 50, roller 39 and pulley 48 can be connected together so that a driving connection can exist from roller 36' through pulley 47, drive belt 49, pulley 48, clutch 50 to roller 39. The circuit for the clutch 50 is controlled, as shown in FIG. 3, by an operating contact of switch 26'.

As exemplary of one mode of operation of the present invention, it will first be assumed that carriage 15' is stationary, conveyor belts 30' and 31' are driven by rollers 32 and 41 respectively and clutch 50 is deenergized. Under these conditions the rollers 36' and 39 are driven by the forward and return reaches of conveyor belt 30' respectively at the same peripheral speed ($v_1 = v_2$). Pulley 48 is also driven via belt 49 by pulley 47 which is connected with roller 36', but, due to the different diameters of the two pulleys, at a slower speed than roller 39.

If now the sensing lever 28 and switch 26' are actuated, brake 24 is deenergized and clutch 50 is excited. By clutch 50 then a rigid connection is produced between the pulley 48 and the roller 39. The peripheral speed $v_2$ of the roller 39 becomes slower and the peripheral speed $v_1$ of the roller 36' becomes greater than the belt speed $V_B$. Consequently, roller 36' conveys a longer length of belt and roller 39 a shorter length of belt because of their speeds relative to the belt speed. Thus, the section of conveyor belt 30' moving from roller 36' over fixed roller 37 to roller 39 is lengthened while the section of conveyor belt passing from roller 39 over the driven fixed roller 32 to roller 36 is shortened. As a result, the stacking carriage 15' is moved backward from the stack, at the constant speed $V_W = (v_1 - v_2)/2$. In this case, the translation ratio Q which is defined as the ratio $v_2/v_1$, is less than 1.

The drive connection between the above-mentioned rollers thus effects a motive power derivation for the stacking carriage 15' from the drive for the conveyor belt 30'. That is to say, the carriage 15' derives an "impressed speed" which after actuation of clutch 50 is obtained during a very short transition process while the stacking carriage is strongly accelerated.

A more general relationship for the carriage speed can be presented in terms of the belt speed ($V_B$) and the translation ratio ($Q$) as follows:

$$V_W = V_B (Q-1)/(Q+1),$$

where $V_W$ is the speed of carriage 15' toward stack 5. If it is desirable to have the carriage 15' move in the direction of the stack 5 under the influence of the controllable drive connection 36, rather than the drive provided, for example, by the brake 24, sprocket 25 and chain 21, then it would be necessary to reverse the relationship shown in FIG. 2 so that pulley 47 is larger in diameter than pulley 48. In this latter case when the clutch is excited, the peripheral speed $v_1$ of the roller 36' becomes slower and the peripheral speed $v_2$ of the roller 39 becomes greater than the belt speed $V_B$. Consequently, roller 39 conveys a longer length of belt and roller 36' a shorter length of belt because of their speeds relative to the belt speed. Thus, the section of conveyor belt 30' moving over fixed roller 37 to roller 39 is shortened while the section of the conveyor belt passing from roller 39 over the driven fixed roller 32 to roller 36 lengthens. As a result, the stacking carriage 15' is moved toward stack 5 at a speed defined by the equation $V_W = V_B (Q-1)/(Q+1)$ when $Q$ is greater than 1.

When the apparatus of the invention is employed in connection with an intermediate stacker it is therefore possible to execute not only the backward movement of the stacking carriage but the forward movement as well. It is moreover possible to drive the stacking carriage in a corresponding manner in both directions through the utilization of two drive connections. One drive connection would have a translation ratio of $Q > 1$ and the other drive connection would have a translation ratio of $Q < 1$.

The mode of operation of the intermediate stacker assembly in other details can be easily understood from the individually described features, insofar as it deviates from the known state of the art, so that further explanation should not be required.

It should be understood that the conveying device according to the present invention is not limited to intermediate stackers but can be employed in all cases where the above-mentioned prerequisites apply.

It will be understood that the above description of the present invention is susceptible to various modifications, changes and adaptations, and the same are intended to be comprehended within the meaning and range of equivalents of the appended claims.

I claim:

1. In a conveyor device composed of a carriage assembly including a linearly displaceable carriage, means associated with the carriage assembly and including at least one conveyor belt, a plurality of movable rollers mounted on the carriage and a plurality of fixed rollers, for delivering individual items to a separator assembly, and a base support supporting the assemblies, the delivering means and the fixed rollers, the device presenting two end locations connected by the at least one conveyor belt, these end locations respectively defining the input and discharge points of the item delivering means, one of the end locations being located on the linearly displaceable carriage and the other end location being located on the base support, the forward reach of the conveyor belt extending from a first fixed roller on the base support at the other end location to a first movable roller on the carriage and from a second movable roller on the carriage to a further fixed roller on the base support, the return reach of the conveyor belt extending from the further fixed roller to two further movable rollers and back to the first fixed roller, each length of each belt reach between a movable roller and a fixed roller extending substantially parallel to the direction of carriage displacement, the conveyor belt being driven by one of the fixed rollers, the driving power for the carriage being derived, for displacement in at least one direction, from the driven conveyor belt, the improvement comprising a controllable drive connection disposed on said carriage between one of said movable rollers which engages said forward reach of said conveyor belt and one of said further movable rollers which engages said return reach of said conveyor belt, for selectively connecting said rollers between which it is disposed in driving relation to linearly displace said carriage, the ratio of the peripheral speeds of said rollers when they are so connected differing from a value of 1 in a sense which determines the direction of displacement of said carriage.

2. A conveying device as defined in claim 1, wherein said device is an intermediate stacker for flat items, further comprising another conveyor belt which forms with said one conveyor belt a mutually contacting conveyor belt segment disposed between the two end locations, said other conveyor belt extending from said discharge point in a direction opposite to the extent of said one conveyor belt from said discharge point to a movable roller and then to a fixed roller in a direction parallel to the displacement direction of said carriage.

3. A conveying device as defined in claim 1, wherein said drive connection comprises a clutch for selectively establishing the drive between said two movable rollers with which it is associated.

4. A conveying device as defined in claim 3, further comprising a separator assembly which includes a belt on which a stack of said items are carried away from said discharge point, wherein said carriage assembly further comprises sensing means disposed in the region to be occupied by a stack of such items for responding to the pressure exerted thereon by said stack and which controls the actuation of said clutch, said device further comprising drive means for driving said carriage toward said stack, and wherein the ratio of the peripheral speeds of said rollers associated with said connection when said clutch is actuated is such that said drive connection drives said carriage away from said stack, and said drive means and said belt of said separator assembly operate simultaneously.

5. A conveying device as defined in claim 3, wherein said drive connection further comprises a first pulley, means connecting said first pulley to said one of said two movable rollers, a second pulley, means connecting said second pulley to the other one of said two movable rollers, and means connecting said pulleys together, said pulleys being of respectively different diameters and said clutch connecting said second pulley to said one of said further movable rollers.

6. A conveying device as defined in claim 3, further comprising a separator assembly which includes a floor belt on which a stack of said items are carried away from said discharge point and which is driven when articles are to be separated, wherein said carriage assembly further comprises sensing means disposed in the region to be occupied by a stack of such items for responding to the pressure exerted thereon by said stack when a predetermined pressure is exceeded, said device further comprising drive means for driving said carriage toward said stack, and the ratio of the peripheral speeds of said rollers associated with said connection when said clutch is actuated being such that said drive connection drives said carriage away from said stack, wherein said clutch is actuated when said sensing means responds and said drive means is actuated only when said sensing means does not respond, and the floor belt is being driven.

* * * * *